(12) United States Patent
Cui et al.

(10) Patent No.: US 9,903,471 B2
(45) Date of Patent: Feb. 27, 2018

(54) CONTROL SYSTEM AND METHOD FOR CONTINUOUSLY VARIABLE TRANSMISSION WITH VARIATOR SPEED RATIO CLOSED-LOOP FEEDBACK

(75) Inventors: John X Cui, Rochester Hills, MI (US); Richard A. Weaver, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1019 days.

(21) Appl. No.: 13/611,428

(22) Filed: Sep. 12, 2012

(65) Prior Publication Data

US 2014/0074366 A1 Mar. 13, 2014

(51) Int. Cl.
*F16H 63/06* (2006.01)
*F16H 61/664* (2006.01)
(Continued)

(52) U.S. Cl.
CPC ....... *F16H 63/065* (2013.01); *F16H 61/6648* (2013.01); *B60K 23/02* (2013.01); *B60W 10/06* (2013.01); *B60W 10/10* (2013.01); *B60W 10/101* (2013.01); *F02B 67/04* (2013.01); *F15B 13/04* (2013.01); *F16H 15/32* (2013.01); *F16H 15/38* (2013.01); *F16H 15/42* (2013.01); *F16H 15/50* (2013.01); *F16H 61/66* (2013.01); *F16H 61/664* (2013.01); *F16H 61/6649* (2013.01); *F16H 61/66259* (2013.01); *F16H 61/70* (2013.01);
(Continued)

(58) Field of Classification Search
CPC ...... F16H 61/0213; F16H 61/66; F16H 15/50; F16H 15/32; F16H 61/66259; F16H 15/38; F16H 61/664; F16H 61/702; F16H 15/42; F16H 61/0021; F16H 15/503; F16H 61/0204; F16H 59/40; F16H 61/6646; F16H 63/065; F16H 61/6648; B60K 23/02; B60W 10/10; B60W 10/06; B60W 10/101; B60W 10/109; B60W 30/188; B60W 10/04; B60W 30/1819; F15B 13/04; G06F 17/00; F02B 67/04; G05B 13/02
USPC ................................................ 701/61, 54, 55
See application file for complete search history.

(56) References Cited

U.S. PATENT DOCUMENTS 3,354,749 A * 11/1967 Sadier .............................. 74/745
5,924,954 A    7/1999 Vukovich et al.
(Continued)

FOREIGN PATENT DOCUMENTS

| CN | 1376245 A | 10/2002 |
|---|---|---|
| CN | 101978196 A | 2/2011 |
| EP | 0916876 A2 | 5/1999 |

*Primary Examiner* — Behrang Badii
(74) *Attorney, Agent, or Firm* — Quinn IP Law

(57) ABSTRACT

A system and method of controlling a continuously variable transmission with variator speed ratio (VSR) closed-loop feedback is provided. The method includes determining a desired VSR based on at least one of the driver and vehicle inputs, determining a motor position adjustment needed to adjust the position of a roller to achieve the desired VSR, driving the motor based on the determined motor position adjustment needed, sensing a transmission output speed as the motor is being driven, determining an actual VSR as the motor is being driven, and providing closed-loop feedback corresponding to any difference between the actual VSR and the desired VSR and driving the motor to eliminate the difference, thereby achieving the desired VSR.

18 Claims, 2 Drawing Sheets

(51) Int. Cl.

| | | |
|---|---|---|
| F16H 15/38 | (2006.01) | |
| F16H 61/70 | (2006.01) | |
| B60W 10/101 | (2012.01) | |
| G06F 17/00 | (2006.01) | |
| F16H 15/50 | (2006.01) | |
| F16H 61/66 | (2006.01) | |
| B60K 23/02 | (2006.01) | |
| B60W 10/06 | (2006.01) | |
| F16H 15/42 | (2006.01) | |
| F02B 67/04 | (2006.01) | |
| F16H 61/662 | (2006.01) | |
| B60W 10/10 | (2012.01) | |
| F16H 15/32 | (2006.01) | |
| G05B 13/02 | (2006.01) | |
| F15B 13/04 | (2006.01) | |

(52) U.S. Cl.
CPC ............ *F16H 61/702* (2013.01); *G05B 13/02* (2013.01); *G06F 17/00* (2013.01)

(56) References Cited

U.S. PATENT DOCUMENTS

| | | | |
|---|---|---|---|
| 6,142,908 A | 11/2000 | Kidokoro et al. | |
| 6,162,144 A * | 12/2000 | Haka | F16H 15/38 475/216 |
| 6,387,009 B1 | 5/2002 | Haka | |
| 6,839,617 B2 | 1/2005 | Mensler et al. | |
| 8,108,108 B2 * | 1/2012 | Field | B60W 10/06 180/197 |
| 8,467,946 B2 * | 6/2013 | Takahashi | F16H 61/66259 475/208 |
| 8,496,554 B2 * | 7/2013 | Pohl | F02B 67/04 180/53.8 |
| 8,892,315 B2 * | 11/2014 | Field | B60W 10/06 180/65.21 |
| 8,996,263 B2 * | 3/2015 | Quinn, Jr. | F16H 61/6649 180/337 |
| 2003/0228952 A1 | 12/2003 | Joe et al. | |
| 2008/0027614 A1 * | 1/2008 | Field | B60W 10/06 701/60 |
| 2009/0132135 A1 * | 5/2009 | Quinn, Jr. | F16H 61/6649 701/55 |
| 2009/0143192 A1 | 6/2009 | Fuchs et al. | |
| 2011/0015836 A1 * | 1/2011 | Takahashi | F16H 61/66259 701/55 |
| 2012/0238386 A1 * | 9/2012 | Pohl | F02B 67/04 475/115 |
| 2013/0325272 A1 * | 12/2013 | Beyer et al. | 701/54 |

\* cited by examiner

CONTROL SYSTEM AND METHOD FOR CONTINUOUSLY VARIABLE TRANSMISSION WITH VARIATOR SPEED RATIO CLOSED-LOOP FEEDBACK

TECHNICAL FIELD

This invention relates to a control system and method having a variator speed ratio closed-loop feedback in a continuously variable transmission for a vehicle.

BACKGROUND

Powertrains that have an internal combustion engine coupled to a continuously or infinitely variable transmission are used to provide efficient drive systems. In continuously or infinitely variable transmissions (hereinafter "CVT"), the transmission ratio can be changed in a continuous manner from a maximum under drive ratio to a maximum over drive ratio. This permits the engine to be operated at either the best fuel consumption area or the best performance area.

The CVT includes a traction drive assembly commonly in the form of a full toroidal type unit or a half toroidal type unit. Both of these devices transmit power or torque from an input disk to an output disk via rollers through a traction force. The CVT generally includes two input disks, two output disks and a plurality of rollers disposed between respective input disk/output disk pairs. Each assembly of an input disk, an output disk and a roller is a variator. Each variator has a variator speed ratio (VSR) which is the ratio between the output disk speed and the input disk speed. The variator speed ratio is a function of the angle at which the roller is positioned. The rollers are rotatably supported on trunions that have a hydraulic force applied thereon to maintain the rollers in the desired position between the respective pairs of input and output disks. The hydraulic force applied to the trunions establishes the fraction force between the disks and rollers. Systems using hydraulic solenoids and similar such hydraulic controls to vary the hydraulic force may not be able to change quickly due to lag in the hydraulic systems.

Current CVT systems may use a stepper motor or other type of accurate device to adjust an actuator position in open-loop so that the desired roller position and thus the desired VSR is achieved. A controller directs the stepper motor to move a number of steps to a calculated position, thus adjusting the actuator position. This calculated position corresponds to the desired VSR. The change in the VSR leads to a change in the transmission speed so vehicle dynamics change. Using these vehicle dynamics changes along with driver input, the CVT control system determines a new desired VSR before the stepper motor is directed to move again, adjusting the actuator position. Therefore, this CVT control system has a slow response time and is very dependent on the accuracy of the stepper motor positioning to achieve the desired VSR. Accordingly, there is a need for a control system to improve the response time and accuracy of the CVT and to reduce the cost due to the required accuracy of the stepper motor.

SUMMARY

A method of controlling a continuously variable transmission with a variator speed ratio closed-loop quick feedback is provided. The method is responsive to driver and vehicle inputs and operates in a system having a variator including at least one roller operatively positioned between an input disk and an output disk so that a variator speed ratio (VSR) is defined as a ratio of a speed of the output disk to a speed of the input disk and a motor to adjust a position of the roller. The method includes determining a desired VSR based on at least one of the driver and vehicle inputs. Next, the method includes determining a motor position adjustment needed to adjust the position of the roller to achieve the desired VSR. The method includes driving the motor based on the determined motor position adjustment needed. Next the method includes sensing a transmission output speed as the motor is being driven, determining an actual VSR as the motor is being driven, and providing closed-loop feedback corresponding to any difference between the actual VSR and the desired VSR. The motor is driven to eliminate the difference between the actual and the desired VSR, thereby achieving the desired VSR with improved quick response time and more accurate control.

A system for controlling a continuously variable transmission in a vehicle which is responsive to driver and vehicle inputs is provided. The system includes a variator having at least one roller operatively positioned between an input disk and an output disk so that a variator speed ratio (VSR) is defined as a ratio of a speed of the output disk to a speed of the input disk and a motor to adjust a position of the roller. The system also includes a controller for controlling the variator and the motor using control modules which determine a desired VSR based on at least one of the driver and vehicle inputs, determine a motor position adjustment needed to adjust the position of the roller to achieve the desired VSR, drive the motor based on the determined motor position adjustment needed, sense a transmission output speed as the motor is being driven, determine an actual VSR as the motor is being driven, and provide closed-loop feedback corresponding to any difference between the actual VSR and the desired VSR and drive the motor to eliminate the difference between the actual VSR and the desired VSR, thereby achieving the desired VSR with improved quick response time and more accurate control.

A vehicle including a system for controlling a continuously variable transmission which is responsive to driver and vehicle inputs is also provided.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
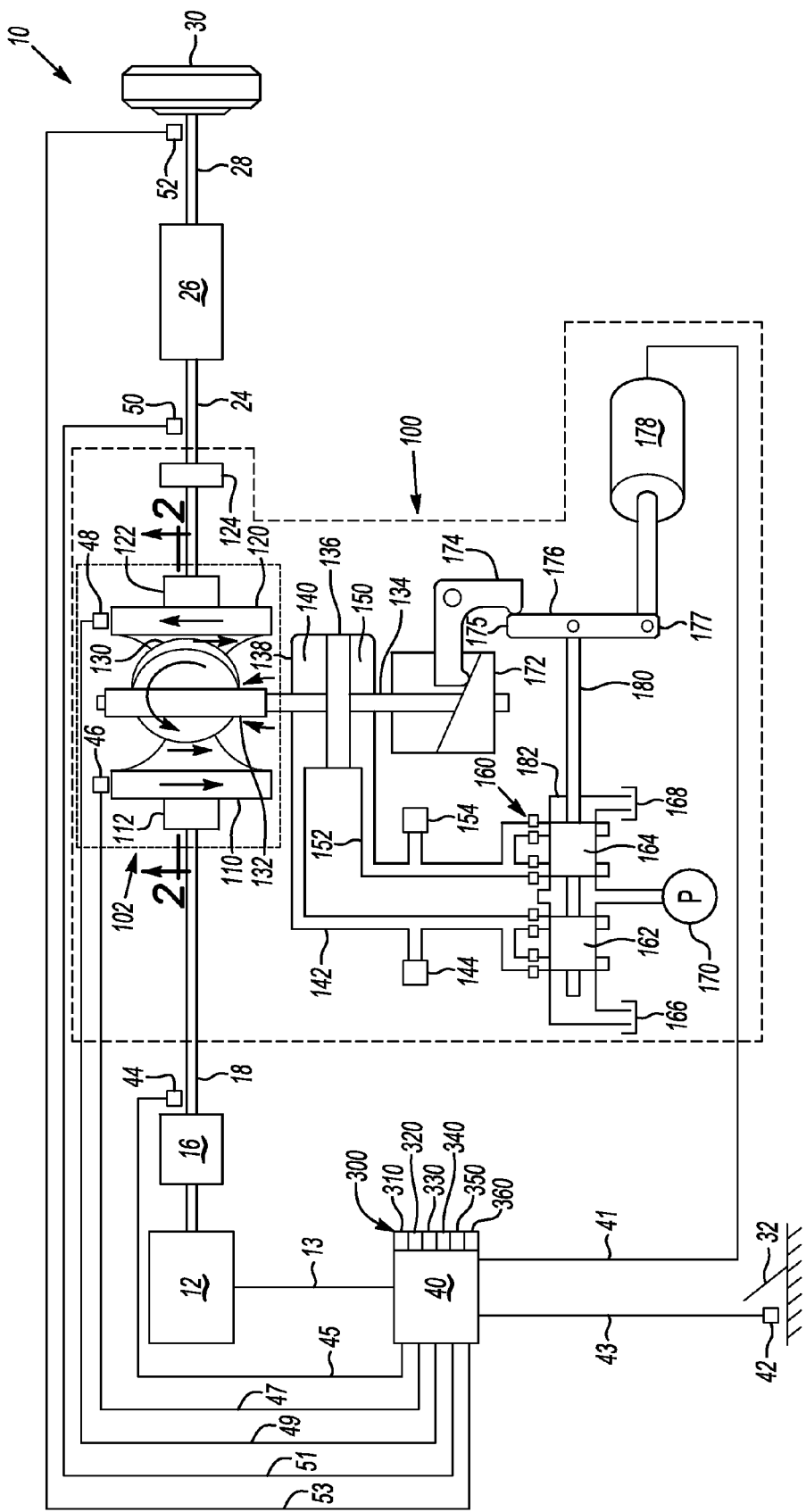
FIG. 1 is a schematic illustration of a continuously variable transmission (CVT) having an improved control system of the present invention.

Referring to FIG. 1, a vehicle 10 including a continuously variable transmission (CVT) 100 having an improved control system with variator speed ratio (VSR) closed-loop feedback of the present invention is shown. The vehicle 10 includes an engine 12, such as an internal combustion engine, which drives a first coupling device 16 such as a clutch. The first coupling device 16 drives the input shaft 18 of the CVT 100 (shown inside longer dashed line for clarity). An output shaft 24 of the CVT 100 connects to a second coupling device 26 such as a differential. The output shaft 28 of the second coupling device 26 may be an axle for propelling wheel 30 of the vehicle 10. The vehicle 10 also includes a driver input device 32 such as an accelerator pedal. An electronic control unit (ECU), referred to as a controller 40 throughout this description, may be positioned external to the CVT 100 for providing the improved control system of the present invention. Alternatively, a transmission control unit (TCU) (not shown) may be located internal to the CVT 100 and may include a controller for providing the improved control system of the present invention.

Various sensors are positioned about the vehicle 10 for sensing and providing signals used in the improved control system of the present invention. For example, an accelerator pedal position sensor 42 may be mounted near the driver input device 32 to provide a driver information signal 43 to the controller 40. A vehicle speed sensor 52 may be mounted near the wheel 30 for providing a vehicle operation information signal 53 to the controller 40. A transmission input speed sensor 44 may be mounted near the first coupling device 16 on the input shaft 18 to provide a transmission input speed signal 45 to the controller 40. A transmission output speed sensor 50 may be mounted between the CVT 100 and the second coupling device 26 on the output shaft 24 to provide a transmission output speed signal 51 to the controller 40. These two signals 45 and 51 may be combined in the controller 40 to provide an actual transmission speed ratio. Although the signals from the sensors are shown as discrete lines, they may be included on a common bus, sent wirelessly, sent on multiple conductor cables or the like for use in the present invention.

Still referring to FIG. 1, the CVT 100 (shown inside longer dashed lines for clarity) includes a variator 102 (shown enclosed in shorter dashed lines for clarity) including at least one input disk 110 and at least one output disk 120 coupled respectively to the input shaft 18 through a torque coupling device 112 and the output shaft 24 through a torque coupling device 122 and, a transmission coupling device 124, if needed. An input disk speed sensor 46 provides an input disk speed signal 47 and an output disk speed sensor 48 provides an output disk speed signal 49 to the controller 40. Operatively positioned between the input disk 110 and the output disk 120 of the variator 102 is at least one roller 130. Although only one representative roller 130, one input disk 110 and one output disk 120 are shown in FIG. 1, one skilled in the art will appreciate that the variator 102 of the CVT 100 generally includes at least two input disks, two output disks and a plurality of rollers disposed between respective input disk/output disk pairs.

Figure 2:
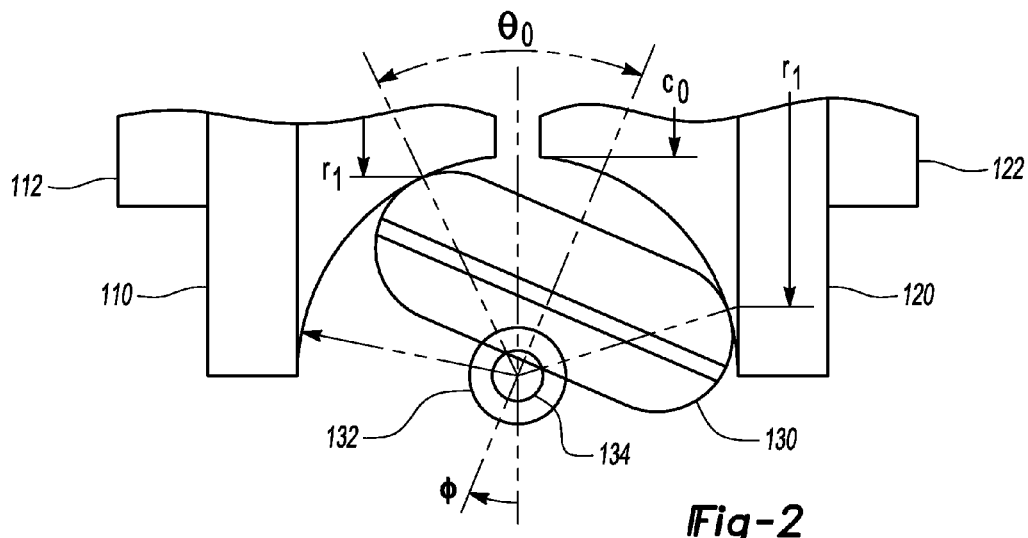
FIG. 2 is a partial schematic view of a variator taken in the direction of line 2-2 of FIG. 1.

As shown in FIGS. 1 and 2, the roller 130 of the variator 102 is rotatably positioned through a plurality of angles to control the amount of power or torque transferred from the input disk 110 to the output disk 120. The roller 130 frictionally engages the disks 110, 120 to transfer power or torque from the input shaft 18 to the output shaft 24. The roller 130 is rotatably supported on a trunion 132 and a rod 134 that has a hydraulic force applied by a piston 136 to maintain the roller 130 in the desired position between the input disk 110 and the output disk 120.

Referring again to FIG. 1, the rod 134 moves through a housing 138 enclosing a part of the rod 134 and the piston 136. The piston 136 and the rod 134 divide the housing 138 into equal area chambers including a first chamber 140 and a second chamber 150. The first chamber 140 is in fluid communication with a first passage 142 and the second chamber 150 is in fluid communication with a second passage 152. The housing 138 includes ball check valves (not shown) which permit fluid communication between the first chamber 140 and the second chamber 150 and the passages 142, 152 respectively, depending on which of the chambers 140, 150 has the higher pressure level. Pressure on the piston 136 and the rod 134 translate as a rotational force on the trunnion 132 to rotate the roller 130 thereby changing the roller 130 position between the input disk 110 and the output disk 120.

The hydraulic pressure in the first chamber 140 and the second chamber 150 is established by a ratio control valve 160. The ratio control valve 160 has a pair of spools 162, 164 connected on a spool rod 180 moving slidably in a sleeve 182. The ratio control valve 160 is connected hydraulically to a pump 170 and two reservoirs 166, 168 respectively for enabling the pressure in passages 142 and 152 to change as the spools 162 and 164 are moved on the spool rod 180 as a motor 178 and a lower link 176 move. The motor 178 may be a DC servo motor, any other motor or any actuator which need not provide the precision control as a stepper motor does. Such precision control is unnecessary due to the closed-loop feedback including module 350 of the improved control system of the present invention (see FIGS. 1 and 3). Referring to FIG. 1, the lower link 176 has a first end 175 which is in contact with an upper link 174 and a second end 177 which connects to the motor 178. Pressure sensors 144 and 154 are in fluid pressure sensing communication with the hydraulic fluid in passages 142, 152 respectively. A cam 172 formed on the rod 134 provides feedback of the angular position of the roller 130 through the upper link 174. The spools 162, 164 are positioned by the motor 178 through the second end 177 of the lower link 176. The sleeve 182 is in fluid communication with passages 142, 152 and fluid reservoirs 166 and 168.

Referring still to FIG. 1, the controller 40 may include digital processing capability and is adapted to issue control signals based on input signals such as the vehicle speed on the vehicle operation information signal 53 and the engine torque via engine signal 13. The controller 40 can be configured as a general purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O), as well as appropriate signal conditioning and buffer circuitry. Any algorithms and control system instructions resident in the controller 40 or accessible thereby, including the improved CVT control system 300 modules (see FIGS. 1 and 3) in accordance with the invention as described, can be stored in ROM and executed to provide the respective functionality.

Figure 3:
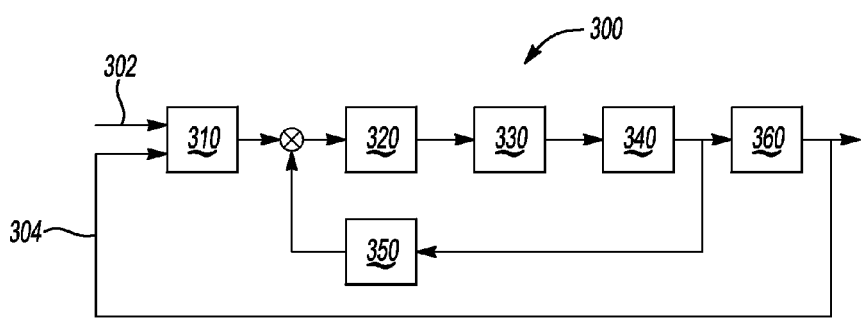
FIG. 3 is a functional block diagram of control modules for the controller of the improved control system of the present invention.

Referring to FIGS. 1 and 3, a block diagram of the improved CVT control system 300 of the present invention is shown. The control system begins, in module 310, by receiving an input signal 302 including driver information, such as the accelerator pedal position as shown. Driver information may alternatively be obtained using the throttle position information from the engine 12 via engine signal line 13. The input signal 302 may also include vehicle information such as the current vehicle speed via vehicle operation information signal 53. These signals are commonly input into controllers such as controller 40. Also engine and vehicle information such as changing vehicle speed or decreasing engine torque are input into module 310 as shown by feedback input signal 304. Based on these inputs, the controller 40 determines a desired VSR in module 310. In the present invention, the output of module 310 is compared with the output of module 350 which provides the actual VSR in closed-loop feedback. The actual VSR can be determined by the controller 40 using a ratio of the actual output disk speed signal 49 and the actual input disk speed signal 47. Alternatively the actual VSR feedback may be determined by the controller 40 using a lookup table based on a graph such as that shown in FIG. 4 of the variator speed ratio (VSR) versus transmission speed ratio (TSR). The transmission speed ratio may be determined by the controller 40 using the ratio of the transmission output speed signal 51 and the transmission input speed signal 45 as shown in FIG. 1.

Still referring to FIGS. 1 and 3, in module 320, the controller 40 determines a motor position adjustment using the desired VSR and any difference between the actual VSR and the desired VSR. (In the startup sequence, there will be no actual VSR so the first module 320 output will correspond to the module 310 output.) The motor position adjustment needed may be determined using a proportional-integral-derivative (PID) algorithm readily available in commercial software. Other closed-loop control algorithms may also be used within the scope of the present invention. In module 330, based on this determined motor position adjustment, the controller 40 sends a motor control signal 41 to drive the motor 178 based on the motor position adjustment and move the lower link 176 causing the spools 162 and 164 to move as described above. This movement causes the pressure difference (in chambers 140, 150) to change, causing the actual VSR to change. In module 340, based on the changing VSR, the controller 40 senses or measures the corresponding actual transmission output speed as it changes. Finally in module 360, the improved control system uses the changed transmission output to propel the vehicle 10 and send a feedback signal 304 composed of changing vehicle speed, changing engine torque and other relevant information as discussed above. This feedback signal 304 is used for determining a new desired VSR in module 310. In a repetitive interval sample, the feedback signal 304 sensed in the controller 40 and including the actual vehicle speed is input into the controller 40 as described above and used in module 310 as a relatively slow feedback signal. Using the actual VSR in module 350, the closed-loop feedback of the present invention provides an improved quick response time and more accurate control than waiting for a vehicle operation status change in order to redetermine the desired VSR in module 310 for use in the next sample interval.

As is apparent from the above discussion, the improved control system of the present invention continually and promptly determines the actual VSR and compares it to the desired VSR so as to drive the motor to the motor adjustment position to eliminate any difference between the actual VSR and the desired VSR. Thus, the improved control system of the present invention achieves the desired VSR with improved quick response time and more accurate control. The closed-loop feedback of the present invention improves over sending a control command to change a stepper motor position which corresponds to a desired VSR and waiting for the vehicle operation status to change before sending a new command to the stepper motor. Since the controller (in the stepper motor system) does not know the actual VSR but only adjusts the desired VSR according to the vehicle operation status, the stepper motor is needed to achieve an accurate position. In contrast, in the improved control system of the present invention, the actual VSR is calculated in module 350 and is provided in a quick feedback loop. Therefore the controller 40 (using control modules 320, 330, 340 and 350) controls the VSR directly via DC servo motor by adjusting the motor position which adjusts the variator.

Figure 4:
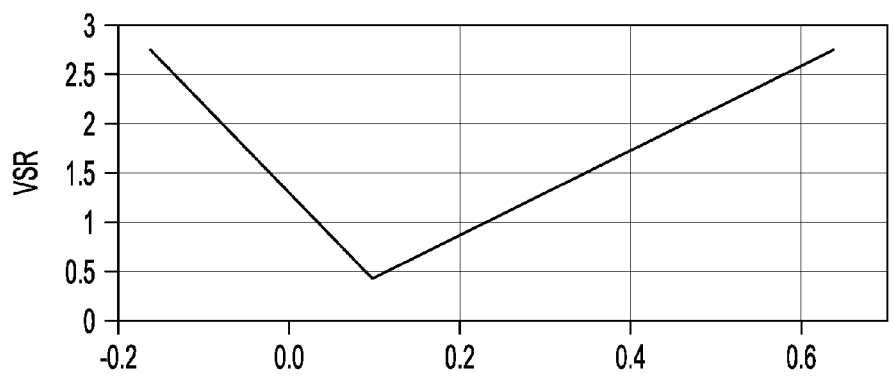
FIG. 4 is a graph of variator speed ratio (VSR) versus transmission speed ratio (TSR) for use with the improved control system of the present invention.

Referring to FIG. 4, an exemplary graph of variator speed ratio (VSR) versus transmission speed ratio (TSR) for use with the control system of the present invention is provided. Using the output of module 340 as described above, the actual VSR may be read from the graph based on the transmission speed ratio in module 350 to provide the closed-loop feedback in accordance with the present invention. An example VSR may range from 0.364 to 2.333 corresponding to a transmission speed ratio ranging from −0.163 to 0 in reverse mode and 0 to 0.654 in forward mode.

Referring again to FIGS. 1 and 3, a method of controlling a continuously variable transmission in a vehicle with a VSR closed-loop quick feedback is provided. The method is responsive to, and includes via input signal 302 and feedback signal 304, driver and vehicle inputs and controls a variator 102 including at least one roller 130 operatively positioned between an input disk 110 and an output disk 120 so that a variator speed ratio (VSR) is defined as a ratio of a speed of the output disk to a speed of the input disk and a motor 178 to adjust a position of the roller 130. The method includes, in module 310, determining a desired VSR based on at least one of the driver and vehicle inputs via input signal 302 and feedback signal 304. Next the method includes, in module 320, determining a motor 178 position adjustment needed to adjust the position of the roller 130 to achieve the desired VSR. The method includes, in module 330, driving the motor 178 based on the determined motor position adjustment needed. The method includes, in module 340, sensing a transmission output speed as the motor is being driven. In module 350, the method includes determining an actual VSR as the motor is being driven, and the method uses a closed-loop feedback corresponding to any difference between the actual VSR and the desired VSR to drive the motor to eliminate the difference, thereby achieving the desired VSR with improved quick response time and more accurate control.

The detailed description of the system and method and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a continuously variable transmission in a vehicle which is responsive to driver and vehicle inputs and which has a variator including at least one roller operatively positioned between an input disk and an output disk so that a variator speed ratio (VSR) is defined as a ratio of a speed of the output disk to a speed of the input disk, and a motor to adjust a position of the roller, comprising:

determining a desired VSR based on at least one of the driver and vehicle inputs;
determining a motor position adjustment needed to adjust the position of the roller to achieve the desired VSR;
driving the motor based on the determined motor position adjustment needed;

sensing a transmission output speed as the motor is being driven;
determining an actual VSR as the motor is being driven; and
providing closed-loop feedback corresponding to any difference between the actual VSR and the desired VSR and driving the motor to eliminate the difference between the actual VSR and the desired VSR, thereby achieving the desired VSR.

2. The method of claim 1 wherein the motor is a DC servo motor.

3. The method of claim 1 wherein determining the motor position adjustment needed uses a proportional-integral-derivative (PID) algorithm.

4. The method of claim 1 including using a feedback signal of a speed of the vehicle for determining the desired VSR.

5. The method of claim 1 wherein determining the actual VSR further includes sensing the output disk speed and the input disk speed as the motor is driven and calculating the actual variator speed as a ratio of the sensed output disk speed and the sensed input disk speed.

6. The method of claim 1 further including sensing a transmission input speed and wherein determining the actual VSR is determined using the ratio of the sensed transmission output speed and the sensed transmission input speed.

7. A system for controlling a continuously variable transmission in a vehicle which is responsive to driver and vehicle inputs comprising:
a variator including at least one roller operatively positioned between an input disk and an output disk so that a variator speed ratio (VSR) is defined as a ratio of a speed of the output disk to a speed of the input disk;
a motor to adjust a position of the roller; and
a controller for controlling the variator and the motor by determining a desired VSR based on at least one of the driver and vehicle inputs, determining a motor position adjustment needed to adjust the position of the roller to achieve the desired VSR, driving the motor based on the determined motor position adjustment needed, sensing a transmission output speed as the motor is being driven, determining an actual VSR as the motor is being driven, and providing closed-loop feedback corresponding to any difference between the actual VSR and the desired VSR and driving the motor to eliminate the difference between the actual VSR and the desired VSR, thereby achieving the desired VSR.

8. The system of claim 7 wherein the motor is a DC servo motor.

9. The system of claim 7 wherein the controller determines the motor position adjustment needed using a proportional-integral-derivative (PID) algorithm.

10. The system of claim 7 wherein the controller further provides feedback of a speed of the vehicle for determining the desired VSR.

11. The system of claim 7 wherein the controller determines the actual VSR by sensing the output disk speed and the input disk speed as the motor is driven and calculating the actual variator speed as a ratio of the sensed output disk speed and the sensed input disk speed.

12. The system of claim 7 wherein the controller senses a transmission input speed and determines the actual VSR using a ratio of the sensed transmission output speed and the sensed transmission input speed.

13. A vehicle including a continuously variable transmission (CVT) which is responsive to driver and vehicle inputs comprising:
an engine for driving an input shaft;
a wheel being propelled by an output shaft; and
a system having:
a variator including at least one roller operatively positioned between an input disk and an output disk so that a variator speed ratio (VSR) is defined as a ratio of a speed of the output disk to a speed of the input disk;
a motor to adjust a position of the roller; and
a controller for controlling the variator and the motor by determining a desired VSR based on at least one of the driver and vehicle inputs, determining a motor position adjustment needed to adjust the position of the roller to achieve the desired VSR, driving the motor based on the determined motor position adjustment needed, sensing a transmission output speed as the motor is being driven, determining an actual VSR as the motor is being driven, and providing closed-loop feedback corresponding to any difference between the actual VSR and the desired VSR and driving the motor to eliminate the difference between the actual VSR and the desired VSR, thereby achieving the desired VSR;
wherein the input shaft is coupled to the input disk and the output shaft is coupled to the output disk.

14. The vehicle of claim 13 wherein the motor is a DC servo motor.

15. The vehicle of claim 13 wherein the controller determines the motor position adjustment needed using a proportional-integral-derivative (PID) algorithm.

16. The vehicle of claim 13 wherein the controller further provides feedback of a speed of the vehicle for determining the desired VSR.

17. The vehicle of claim 13 wherein the controller determines the actual VSR by sensing the output disk speed and the input disk speed as the motor is driven and calculating the actual variator speed as a ratio of the sensed output disk speed and the sensed input disk speed.

18. The vehicle of claim 13 wherein the controller senses a transmission input speed and determines the actual VSR using the ratio of the sensed transmission output speed and the sensed transmission input speed.

* * * * *